US011121604B2

(12) United States Patent
Post

(10) Patent No.: US 11,121,604 B2
(45) Date of Patent: Sep. 14, 2021

(54) ELECTROSTATIC GENERATOR ELECTRODE-CENTERING AND SEISMIC-ISOLATION SYSTEM FOR FLYWHEEL-BASED ENERGY STORAGE MODULES

(71) Applicant: Lawrence Livermore National Security, LLC, Livermore, CA (US)

(72) Inventor: Richard F. Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 18 days.

(21) Appl. No.: 16/729,317

(22) Filed: Dec. 28, 2019

(65) Prior Publication Data

US 2020/0136464 A1    Apr. 30, 2020

Related U.S. Application Data

(63) Continuation-in-part of application No. 15/202,446, filed on Jul. 5, 2016, now Pat. No. 10,541,586.

(51) Int. Cl.

| | | |
|---|---|---|
| *F16F 15/31* | (2006.01) |
| *H02K 7/02* | (2006.01) |
| *H02N 1/08* | (2006.01) |
| *H02N 15/00* | (2006.01) |
| *H02N 1/00* | (2006.01) |
| *F16F 15/315* | (2006.01) |

(52) U.S. Cl.
CPC .......... *H02K 7/025* (2013.01); *F16F 15/315* (2013.01); *H02N 1/002* (2013.01); *H02N 1/08* (2013.01); *H02N 15/00* (2013.01)

(58) Field of Classification Search
CPC ......... H02K 7/025; F16F 15/315; H02N 1/08; H02N 15/00; H02N 1/002
USPC ....................................................... 310/309
See application file for complete search history.

(56) References Cited

U.S. PATENT DOCUMENTS

| 3,761,148 A | 9/1973 | Grosbard |
| 5,847,480 A | 12/1998 | Post |

(Continued)

FOREIGN PATENT DOCUMENTS

| FR | 28882203 A1 | 8/2006 |
| JP | 2007-202231 A | 8/2007 |
| WO | 2016025181 A1 | 2/2016 |

OTHER PUBLICATIONS

European Supplemental Search Report for EP 17824669.0 corresponding to PCT/US2017/033694, 5 pages.

(Continued)

*Primary Examiner* — John K Kim
(74) *Attorney, Agent, or Firm* — Zilka-Kotab, P.C.

(57) ABSTRACT

Robust electro-static (ES) device embodiments, with application to energy storage flywheels as an example, are described that provide reliable, high-efficiency operation in the presence of thermal and mechanical perturbations, as well as seismic events. Electro-static generators and motors, when augmented with magnetic bearings, passive three-dimensional stabilization techniques and dynamic touch-down bearings, enable robust performance in the face of these environmental concerns, as well as efficient operation during typical operational sequences, including spin-up and steady-state modalities.

9 Claims, 15 Drawing Sheets

(56) References Cited

U.S. PATENT DOCUMENTS

| | | |
|---|---|---|
| 6,710,489 B1 | 3/2004 | Gabrys |
| 6,794,777 B1 | 9/2004 | Fradella |
| 6,825,588 B2 | 11/2004 | Gabrys |
| 7,834,513 B2 | 11/2010 | Post |
| 8,823,233 B2 * | 9/2014 | Post ................... F16C 32/0448 310/90.5 |
| 10,030,701 B2 | 7/2018 | Helgesen et al. |
| 10,541,586 B2 * | 1/2020 | Post ........................ H02N 1/08 |
| 2002/0047492 A1 | 4/2002 | Jones |
| 2008/0252162 A1 | 10/2008 | Post |
| 2010/0283340 A1 | 11/2010 | Fradella |
| 2011/0291506 A1 * | 12/2011 | Post ..................... F16C 41/001 310/90.5 |
| 2012/0080978 A1 * | 4/2012 | Makhlouf ................ G21H 1/00 310/305 |
| 2012/0211990 A1 | 8/2012 | Davey |
| 2012/0274177 A1 | 11/2012 | Sashida |
| 2013/0134828 A1 | 5/2013 | Okada et al. |
| 2018/0013331 A1 * | 1/2018 | Post ....................... H02N 15/00 |
| 2020/0136464 A1 * | 4/2020 | Post ....................... H02N 15/00 |

OTHER PUBLICATIONS

International Search Report and Written Opinion for PCT/US2017/033694 corresponding to U.S. Appl. No. 15/202,446, 11 pages.
International Search Report and Written Opinion from PCT Application No. PCT/US2020/066968, dated Jul. 8, 2021.

\* cited by examiner

ELECTROSTATIC GENERATOR ELECTRODE-CENTERING AND SEISMIC-ISOLATION SYSTEM FOR FLYWHEEL-BASED ENERGY STORAGE MODULES

CROSS-REFERENCE TO RELATED APPLICATIONS

This application is a continuation-in-part of U.S. patent application Ser. No. 15/202,446 titled "Electrostatic Generator Electrode-Centering and Seismic-Isolation System for Flywheel-Based Energy Storage Modules," filed Jul. 5, 2016, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to electrostatic generators, and more specifically, it relates to systems for maintaining the gap between the stator electrodes and the a ting electrodes of a flywheel rotor of an electrostatic generator.

Description of Related Art

In the design of flywheel-based, energy storage modules, there are critical mechanical and structural requirements that must be taken into account to realize operation in the face of environmental issues. Examples of environmental concerns include thermal and mechanical perturbations, as well as seismic events. Robust device designs, augmented with passive magnetic bearings and stabilization techniques, are therefore crucial to the successful implementation of next-generation practical electrostatic (ES) generators and motors.

Bulk ES-based energy storage systems, as an example, can benefit from the use of magnetic bearings and levitation techniques, embodiments of which are described herein. These motors and generators must operate at high rotational speeds, while maintaining stringent dimensional tolerances during the setup, initial spin-up, and steady-state operation of the system. Additionally, these critical tolerances must be maintained in the presence of environmental perturbations, including shock accelerations, such as those that would arise from seismic activity.

Electrostatic (ES) generator/motors, as described in the prior art, can be operated in either a generator or a motor mode. Such devices have application to flywheels for bulk energy storage, among myriad commercial and defense uses. In general, electrostatic generator/motors involve the use of an assembly of rotating and stationary elements that together comprise a condenser (or, capacitor), the capacitance of which varies periodically with the motion of the rotating elements relative to the fixed elements.

An example of an ES device in prior art is shown in FIG. 1A (top view) and in FIG. 1B (side view). This prior art is described in an issued patent by the present inventor (U.S. Pat. No. 7,834,513 B2, "Electrostatic generator/motor having rotors of varying thickness and a central stator electrically connected together into two groups"). U.S. Pat. No. 7,834,513 is incorporated herein by reference.

Turning now to FIG. 1A, a circular array of fan-like stationary elements, 100, is depicted. Below this stationary array of elements, referred to as the "stator," is a similar circular array of elements, which is allowed to rotate about a vertical axis, referred to as the "rotor." FIG. 1B shows a cross-sectional side view of the overall ES structure, showing an embodiment consisting of a set of two rotors, 106, with each respective rotor also comprised of a circular array of fan-like elements. Each respective rotor plate is bound on each circular surface by a stationary array of opposing, fan-like elements. One such pair of stator discs, 100 and 104, in the case of the first rotor, 106; and a second pair of stator discs, 104 and 102, in the case of the second rotor, 106. The rotor plates are allowed to rotate about an axis oriented orthogonal to the plane of the fixed plates, as shown in FIG. 1A.

As shown in FIG. 1B, the rotors 106 in this device architecture are comprised of a set of annular, fan-like segmented elements, with each such element having a thickness greater than the basic substrate of the disc. In general, the thick fan-like sections elements of the rotor can consist of metallic (conductive) material, dielectric material or combinations thereof. Each pair of fixed fan-like elements, which comprises the opposing stationary plates, forms a capacitor of a fixed gap, g, in between which, each respective rotor revolves. The rotor disc consists of segmented "plateaus" or "islands" of alternating raised and baseline regions. The height of these segmented islands will result in a concomitant change in the capacitance across the pair of opposing stator plates. As the rotor disc revolves about its axis, the capacitance between each pair of opposing stationary plates will vary periodically. The time-dependent capacitance results from differences in the capacitive gap dimension between the rotor and stator discs.

In general, the rotor disc can be comprised of metallic and/or dielectric materials, resulting in a time-dependent capacitance as each fan-like segment of the rotor passes between each respective pair of fixed spaced stator discs in the array. We note that the basic configuration of FIGS. 1A and 1B can be classified as a planar geometry, since the effective capacitors are formed via the opposing planar surfaces of the disc-based stators and rotors.

In another prior-art ES device embodiment (not shown), the stators and rotors are configured as an ensemble of cylindrical structures, oriented about a common axis. In this second embodiment, one (or more) cylindrical structure rotates about the common axis (the rotor), whereas, the remaining cylindrical structure(s), at a different radius, remains stationary (the stator). As an example of this embodiment, each cylindrical structure can be comprised of an ensemble of small-diameter axial metallic rods, arranged in an annular ring. In this case, the effective gap, g, will be a function of the time-dependent difference in the distance from one (or more) fixed stator rods to one (or more) rotating rotor rods in the overall structure.

In most cases, the gap, g, is small, typically, in the range of millimeters, so that the capacitance is maximized. Moreover, during operation, the change in the gap, g, can vary by a significant fraction of its overall spacing. This design rule follows, since the stored electric-field energy of the ES generator is a function of the ratio of the maximum to the minimum capacitance during operation.

In general, therefore, it is essential that the spacing, g, between the rotor and stator electrodes of the ES generator/motors be maintained within close tolerances during the setup, initial spin-up, and steady state operation of the system. It is further critical that these tolerances be maintained in the presence of environmental perturbations, including shock accelerations, such as those that would arise from seismic activity.

During operation, the rotors can experience rotational tangential velocities approaching $10^5$ cm/second, while maintaining a gap spacing, g, on the order of 2.5 mm, the latter of which must be maintained to within fractions of a millimeter. The invention described herein provides embodiments that can enable the ES devices to perform within these stringent dimensional tolerances, and, furthermore, to maintain these critical dimensional tolerances in the face of real-world environmental perturbations.

Halbach arrays are well known in the art and are comprised of an ensemble of magnetic elements, arranged in the form of a linear or circular array. FIG. 3 shows an example of a prior-art linear Halbach array 300, comprised of a linear sequence of magnetic elements 310. When the ensemble of elements 310 is properly configured, the resultant magnetic field distribution is maximal above one surface of the array, while minimal above the opposing surface. FIG. 4 shows a calculated magnetic field distribution of the array 400, whose configuration corresponds to that shown in FIG. 3. As shown in FIG. 4, this particular arrangement of magnetic elements results in an enhanced magnetic field strength, 410, above one surface; and, concomitantly, a diminished magnetic field strength, 420, above the opposing surface.

An example of a prior-art, passive array stabilizer is shown in FIG. 5A, depicting a bearing element with its axis in the vertical direction. This prior art is described in an issued patent by the present inventor (U.S. Pat. No. 5,847,480, "Passive Magnetic Bearing Element with Minimal Power Losses"). This subsystem employs passive elements with compensating force derivatives in order to achieve stable levitation, with minimal power losses during operation. In this example, the stabilizer employs a spatially periodic magnetic field, such as is produced by a spatially periodic magnetic array (e.g., a Halbach array), in combination with inductive circuit elements, to produce the desired stabilizing force derivatives that overcome the destabilizing force derivatives from other elements. U.S. Pat. No. 5,847,480 is incorporated herein by reference.

Turning now to FIG. 5A, the spatially periodic magnetic arrays (e.g., the Halbach arrays), 510 and 512, are attached by shaft 514 and lie above and below the planar array of inductive circuits (e.g., inductively loaded circuits), 516. Array 516 consists of an inductive circuit having a circuit conductor 518, with inductive loading 519. In general, array 510 is fixed to, and spaced apart from, array 512. FIG. 5B shows a top view of the planar conductor array 516 of FIG. 5A and a representative magnet segment 515, with $r_1$ and $r_2$ corresponding to the respective inner and outer radius of the annular Halbach array magnet elements. The planar conductor array 516 is movably located, in an axial direction, between fixed arrays 510 and 512.

In this system, the axial flux through the planar circuits is nulled out when their symmetry plane corresponds to the mid-plane between the magnets, becoming finite only when the magnet array is displaced vertically with respect to the planar circuit. The permanent magnet elements are arranged so as to reach force equilibrium with external forces (i.e., gravity) at an axial position corresponding to the location where the (relative) rotating spatially periodic magnet arrays lie symmetrically above and below the planar circuit, the induced current. Thus the resistive power dissipation of this stabilizer will approach zero.

SUMMARY OF THE INVENTION

In what follows, we describe embodiments that can satisfy critical operational requirements of an electrostatic generator flywheel-based energy storage module, through the implementation of three interrelated subsystems: (1) A "gap control" subsystem, which provides passive axial positioning of the stator and rotor elements via magnetic-based centering; (2) A "passive array stabilizer" subsystem, which provides passive three-dimensional stabilization via Halbach magnetic arrays and induction techniques; and (3) A "touch-down bearing" subsystem, which assures stable operation during device spin-up, as well as uninterrupted device functionality in the face of transient perturbations. In the exemplary embodiments below, ES devices that employ these techniques in concert, will function robustly under real-world conditions, while maintaining stringent tolerances and stability in three dimensions.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
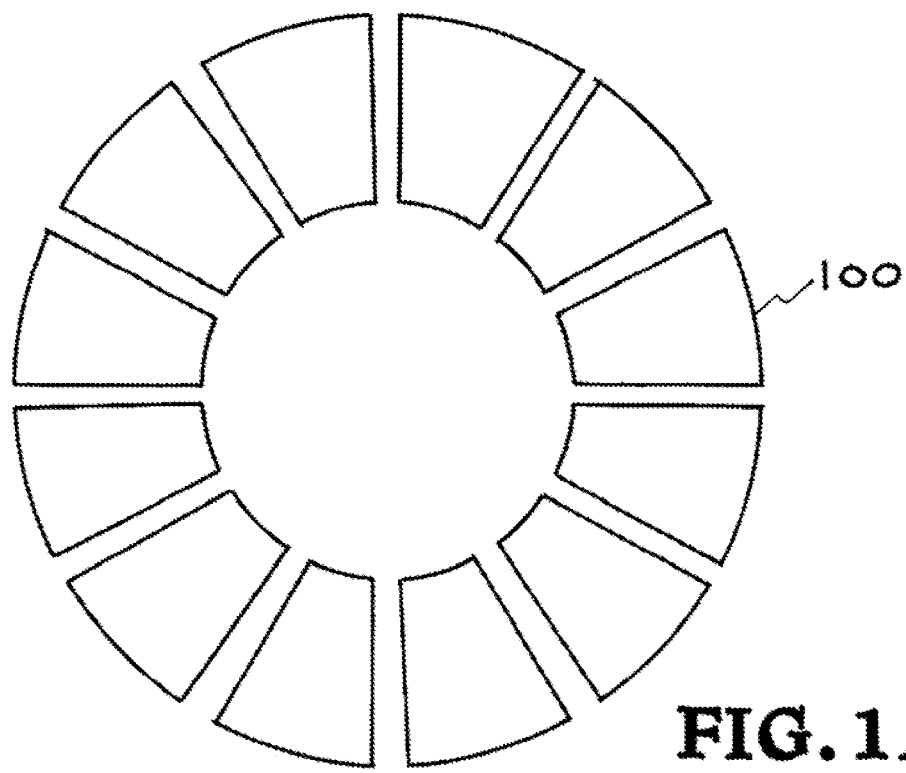
FIG. 1A depicts a top view of a multi-element electrostatic motor of the prior art, comprised of fan-like, planar electrodes.
Figure 1B:
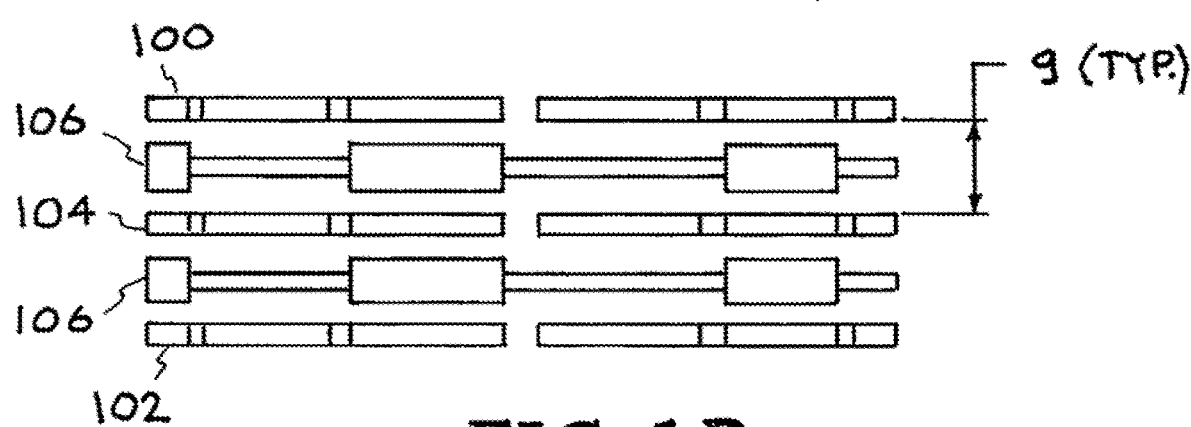
FIG. 1B depicts a cross-sectional side view of the multi-element electrostatic motor of FIG. 1A.
Figure 2:
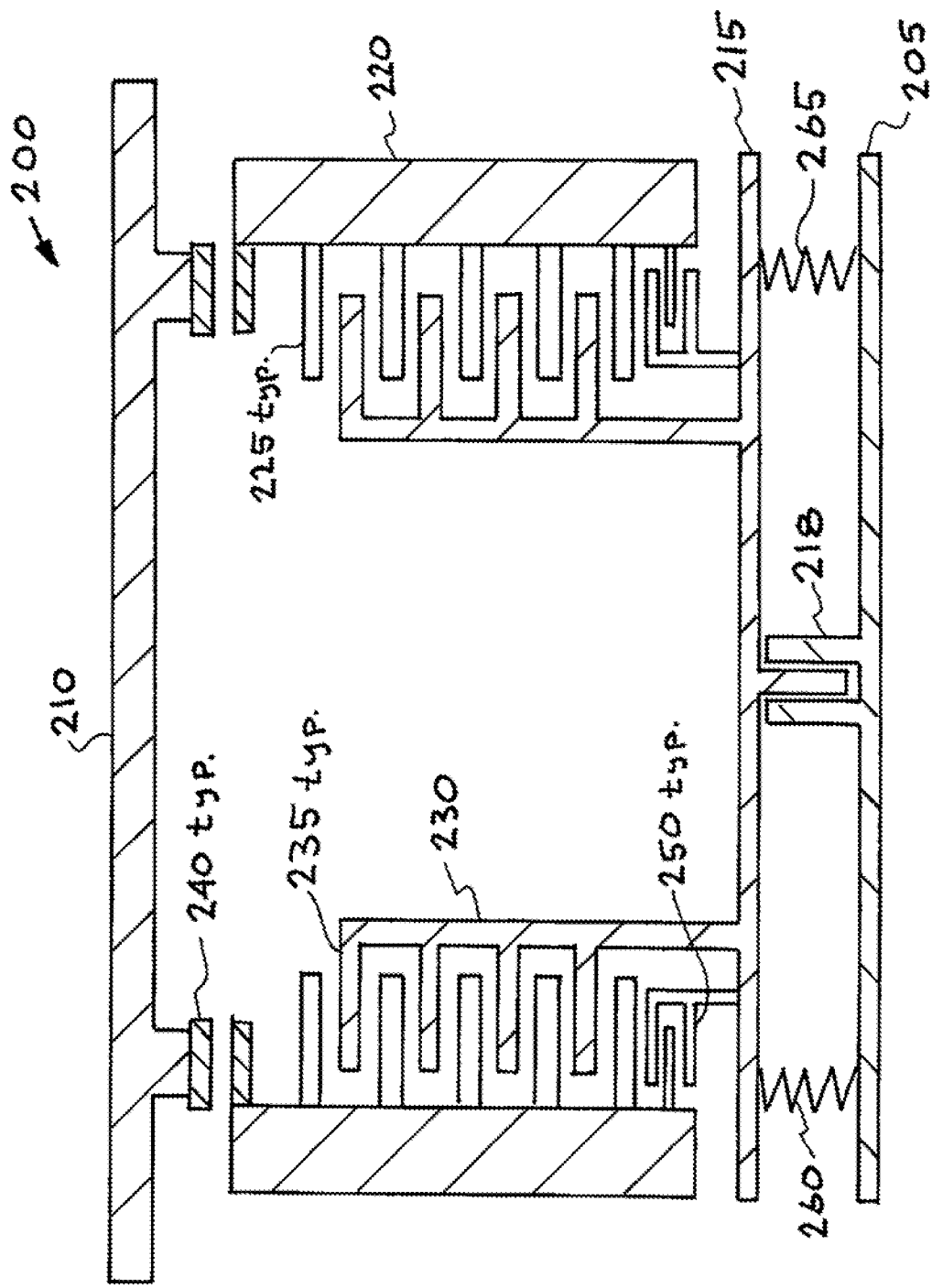
FIG. 2 shows an embodiment of an ES device, augmented with magnetic levitating arrays and magnetic centering arrays.
Figure 3:
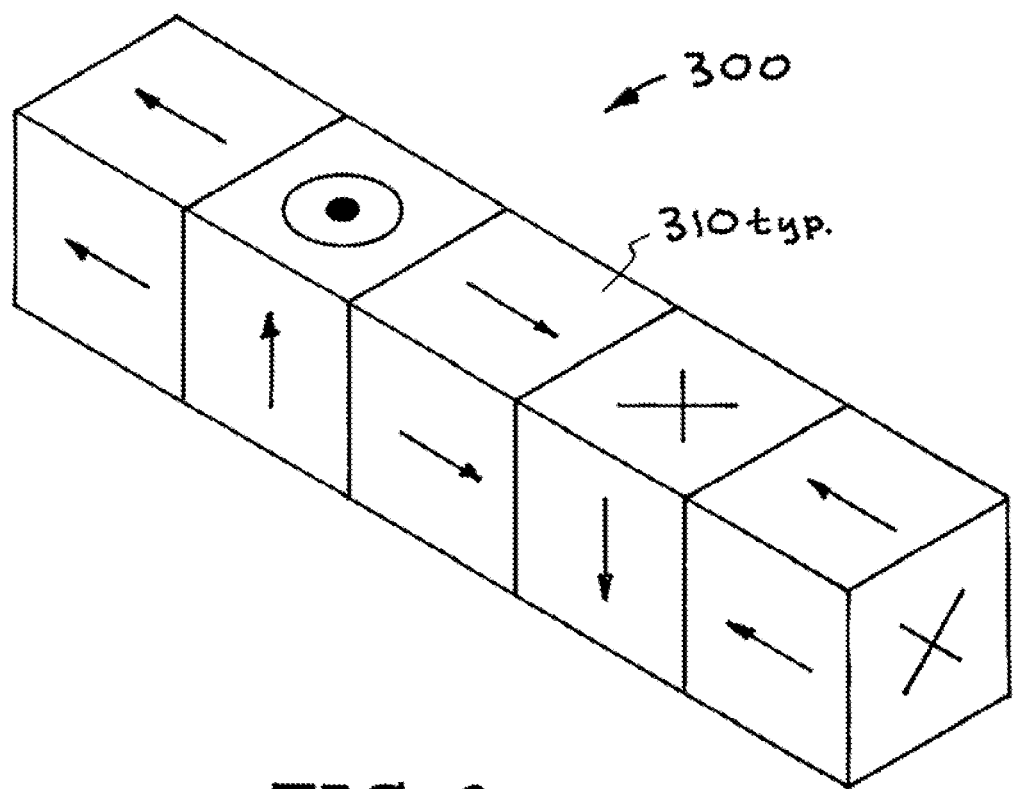
FIG. 3 shows an example of a linear Halbach magnetic array of the prior art.
Figure 4:
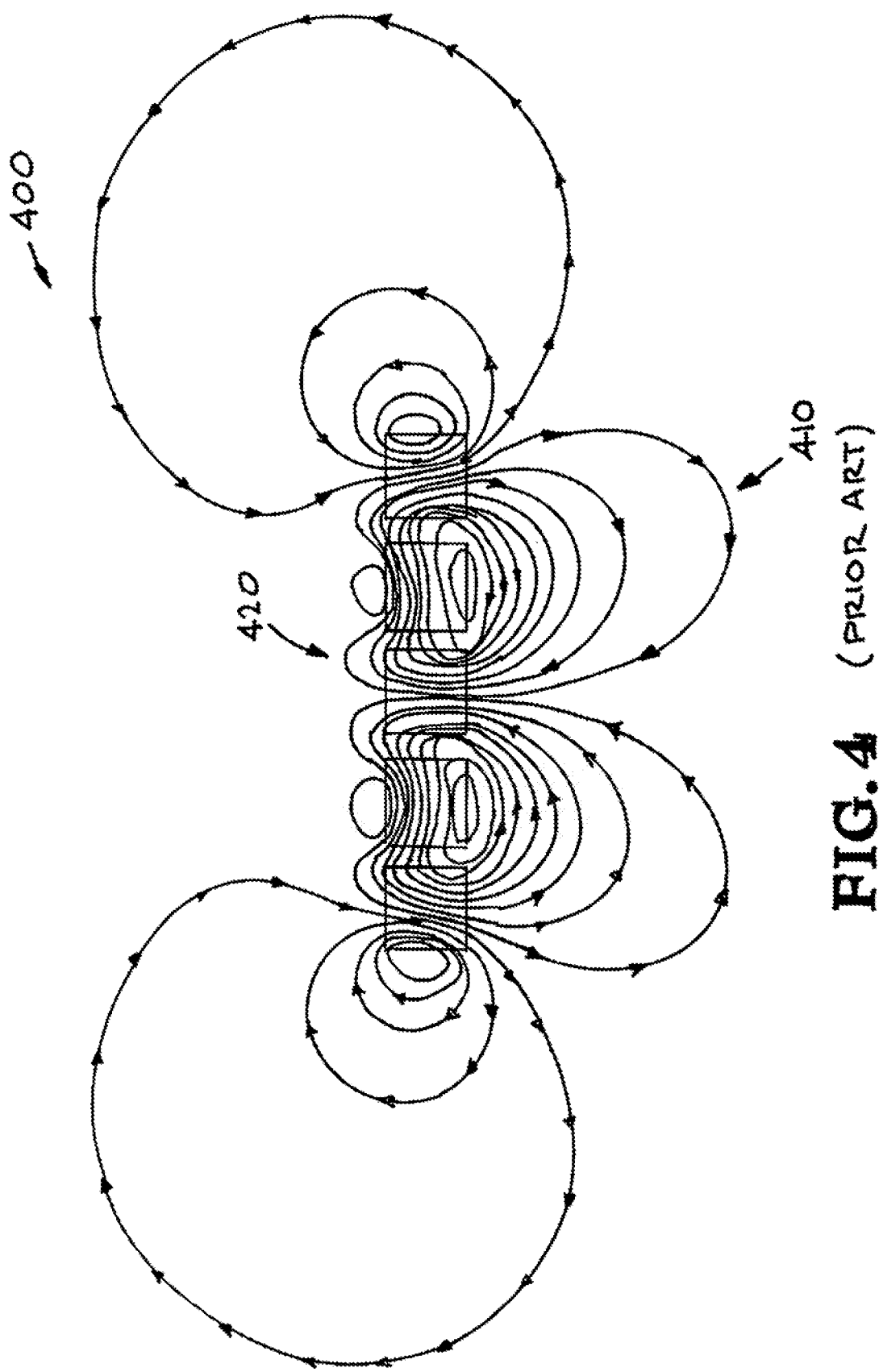
FIG. 4 shows a calculation of the resultant magnetic field distribution from the Halbach array of FIG. 3.

An exemplary embodiment of the present invention is shown in FIG. 2, which depicts a flywheel based electrostatic (ES) motor/generator, 200. A key aspect of this invention pertains to methods by which to maintain the centering of the rotating electrodes (the rotor) within a close tolerance relative to the stator electrodes. Without loss of generality, the revolving rotor in this embodiment is of a nominal radius greater than that of the fixed stator. In other embodiments, the rotor can be of a nominal radius less than that of the stator, in which case, similar device augmentations, as discussed herein, equally apply.

Turning now to FIG. 2, the basic components of a stabilized ES device 200 are shown. The device is comprised of a flywheel rotor assembly, 220, which consists of multiple rotor electrode elements 225. In addition, the device is comprised of a stationary stator assembly, 230, which consists of multiple stator electrode elements, 235. The rotor and stator elements are configured so that they alternate with one another along the axial direction.

The radial alignment of the respective rotor and stator elements is maintained by a pair of non-contacting, annular, levitating arrays 240, with one of the arrays affixed to the rotor assembly 220, and the opposing array affixed to an upper support structure, 210. The respective field poles of the upper levitating arrays are oriented so that the force between the pair of annular magnetic elements is attractive. In this configuration, the radial alignment is stable, whereas, the axial alignment is unstable.

The axial alignment of the respective rotor and stator elements is maintained by a magnetic centering array 250. This passive array provides a centering force, which acts between the respective support structures, 220 and 230. In this example, the centering array 250 is in the form of three annular magnet arrays, referred to as a "triplet array." This array is comprised of either annular magnets or opposing annular Halbach arrays, whose periodicity is in the radial direction. The magnetic poles of the respective elements that comprise the triplet array 250 are oriented so that a repulsive force is formed between the central element with respect to each of the surrounding elements (i.e., the upper and lower elements) of the ensemble. In this configuration, the axial alignment is stable, whereas, the radial alignment is unstable.

Returning to the embodiment of FIG. 2, the upper and lower arrays that comprise the triplet centering array are rigidly supported from below on a planar structure, 215, which is, in turn, supported by compression springs, 260 and 265. The platform 215 also supports the stator assembly 230, to which is attached the respective stator electrodes 235. On the other hand, the central element of the triplet centering array 250 is rigidly attached to the rotor assembly 220, to which is attached the respective rotor electrodes 235. Alternatively, the configuration of centering array 250 can be reversed such that the two outer annular magnets are attached to the inner face of rotor 220 and the center annular magnet of centering array 250 is positioned between the two outer annular magnets and is fixedly attached to planar support platform 215.

To ensure that the motion of the planar support platform 215 is constrained to purely vertical motion, it is fitted with one or more guide pins and guide sleeves, 218, as shown in FIG. 2. Alternate means for constraining the support platform will be apparent to those skilled in the art based on this disclosure. Also included in this embodiment are compression-spring centering elements, 260 and 265; and a seismic isolation support structure, 205. The net stiffness of the compression springs 260 and 265 are selected to be much smaller than that of the effective stiffness of the centering triplet magnet array 250. Using this design rule, the relative axial position of the rotor electrodes 225 and stator electrodes 235 will be maintained nearly constant, even for large (environmentally induced) changes in the gap between the support plate 215 and the base-plate 205 of the flywheel module.

For this system, the change in the gap, Δg, of the centering triple magnet array 250 (and thus of the gap between the rotor and stator electrodes) as a function of the change in vertical position of the rotor, Δz, is given by Equation (1) as follows:

$$\Delta g = \left[\frac{K_{spring}}{K_{brg}}\right]\Delta z \qquad (1)$$

Here the effective stiffness values, K, are those of the combined compression springs, $K_{spring}$, and of the lower triplet annular permanent magnet arrays, $K_{brg}$, respectively. As can be seen from the equation, if the stiffness of the combined compression springs 260 and 265 is much smaller than that of the lower triplet magnet arrays 250 (i.e., the ratio, $K_{spring}/K_{brg}$<<1), the variation, Δg, from centrality of the position of the center magnet of the triplet 250, relative to the upper and lower magnets, as a result of external forces, will be greatly diminished. Under these conditions the vertical spacing, g, between the E-S generator rotor and stator electrodes will lie minimally affected, and, thus, more robustly maintained. Additional stiffness requirements for the elements of the complete passive bearing system will be described below.

In the operation of the passive magnetic bearing system of the type shown in FIG. 2, the lower and upper magnetic bearing assemblies are dissimilar in that the lower assembly 250 is composed of a triplet of repelling magnet arrays, whereas the upper assembly 240 is a purely attracting array. As a consequence of this state of affairs, the lower triple bearing assembly 250 has positive stiffness in the axial direction (thus stabilizing for axial displacements), and negative (unstable) stiffness in the radial direction. Conversely, the upper levitating magnet array pair 240 has the opposite characteristics. That is, the magnetic bearing 240 has positive stiffness (stabilizing) in the radial direction, and negative stiffness (destabilizing) in the axial direction.

Depending on the relative magnitudes of the respective upper and lower bearing stiffness, each respective levitating bearing system will either be stable radially and unstable axially, or vice-versa. This fact stems from the so-called Earnshaw Theorem-based instability. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e.g., gravity. In other words, if such a bearing element is designed to be stable against radially directed displacements, it will be unstable against axially directed displacements, and vice versa. The assumptions implicit in the derivation of Earnshaw's Theorem are that the magnetic fields are static in nature (i.e., that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to ensure stability along the remaining axes. The "means" referred to could either be mechanical, i.e., ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium. Passive stabilization techniques have also been described in the prior art.

Figure 5A:
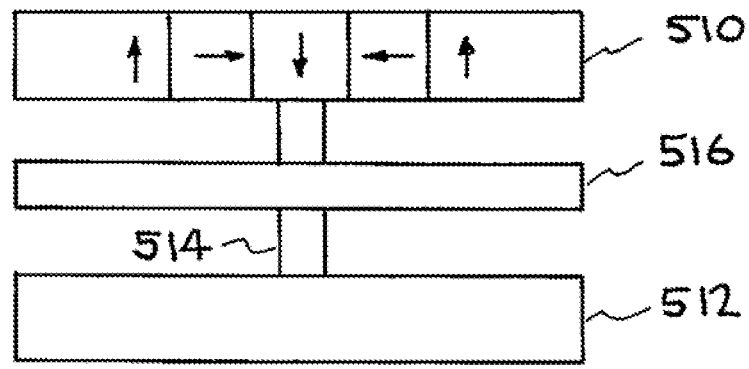
FIG. 5A depicts a side view of a Halbach array-based axial stabilizer of the prior art, configured using a pair of disc-shaped Halbach arrays, between which is an inductive circuit disc, coaxially configured about a common axis.
Figure 5B:
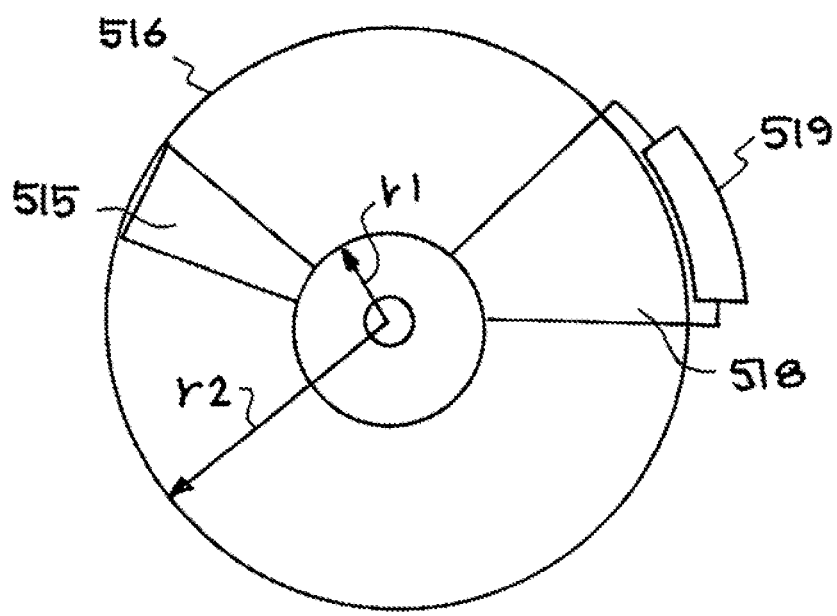
FIG. 5B depicts a top view of the inductive circuit disc component of FIG. 5A.
Figure 6:
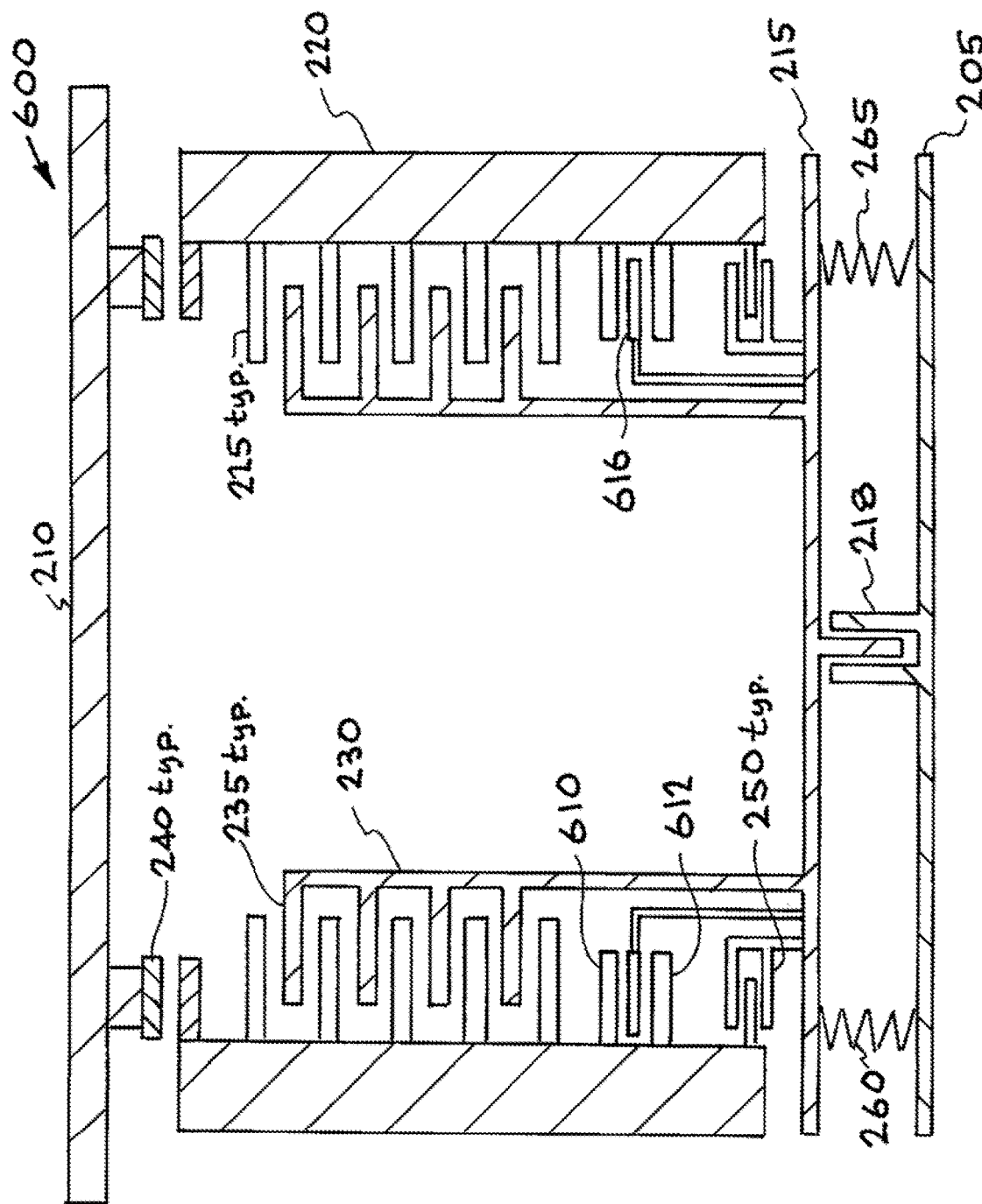
FIG. 6 shows an embodiment of the ES device of FIG. 2, augmented with a Halbach-based axial stabilizing array.

FIG. 6 shows an embodiment of an ES device, 600, which employs a "passive array stabilizer" subsystem (similar to that described with respect to FIG. 5A and FIG. 5B), using Halbach arrays, to overcome the Earnshaw Theorem-based instability. Aside from the stabilizer, the basic ES device is otherwise identical to that discussed with reference to FIG. 2. In the embodiment of FIG. 6, the passive stabilizer is configured so that the pair of Halbach arrays, 610 and 612, is rigidly mounted to the rotor assembly 220. The inductive circuit element, 616, on the other hand, is rigidly mounted to the fixed stator plate, 215. Recall, that the stator assembly 230 and the centering array 250 are also rigidly attached to the stator plate 215. In a related embodiment, the passive stabilizer subsystem can be configured so that the pair of Halbach arrays, 610 and 612, is mounted to the fixed stator plates 215, whereas the inductive circuit 616 element is mounted to the rotor assembly 220. Operationally, both embodiments function identically. The skilled artesian will appreciate that well known engineering considerations will determine the approach of choice.

In general, the passive array stabilizer subsystem can be utilized to circumvent various classes of instabilities, be they of axial or radial origin. Hence, the present invention could operate in either one of these cases. As depicted in FIG. 6, we will here only describe its operation in the case whereby the overall system is intrinsically stable radially (i.e. the positive radial stiffness of the attracting bearing array pair is greater than the negative radial stiffness of the triplet array). For this case, the appropriate Halbach array stabilizer is an "axial stabilizer" namely, one in which the windings of the stabilizer are midway between upper and lower annular Halbach arrays, with the periodicity of these arrays being in the azimuthal direction, and with the arrays oriented azimuthally so that their axial-field components cancel at the mid-plane, as described in the prior-art embodiment of FIG. 5A and FIG. 5B.

Returning to FIG. 6, the present invention comes into play in the initial alignment of the components as follows: In the initial alignment step of the device, it is required that the operating gap of the upper levitating array 240 be adjusted so that its combined upper and lower levitating bearings thereof have a net positive radial stiffness at the position of force equilibrium of the levitated mass (flywheel rotor, electrostatic generator/motor and rotating elements of the passive bearing system) with gravity.

Once the initial alignment procedure is completed, the Halbach array stabilizer arrays and the stabilizer windings are then adjusted axially so that the null-plane of the arrays coincides both with the center plane of the stabilizer windings and with the force-equilibrium axial position of the rotor and its attachments. For this operation, the inclusion of low-stiffness compression springs, 260 and 265, that allows the stator electrodes to follow the axial motion of the rotor, both facilitates the setting up of the system and, in addition, provides insensitivity to seismic activity.

Figure 7:
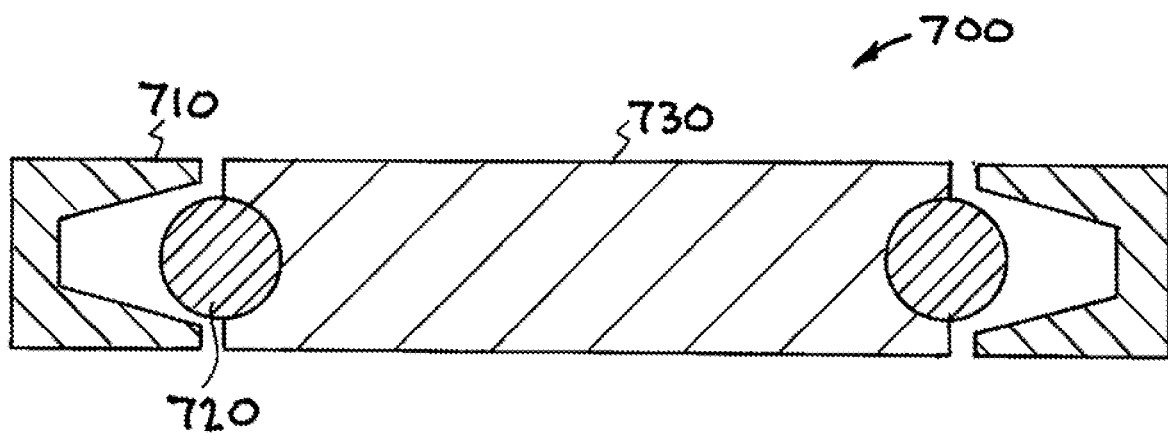
FIG. 7 shows an embodiment of a touch-down bearing assembly.

FIG. 7 shows a subsystem, 700, referred to as a "touch-down bearing," and comes into operation upon either axial or radial displacements of the rotor. IN one embodiment, this bearing could be located above, and supported by, the support plate that carries the lower levitating passive bearing Halbach array. The bearing assembly is comprised of an annular conical slot, 710, attached to the rotor, plus an array of spherical "rollers," 720, supported by shafts, 730, which are, in turn, connected to the support plate upon which the lower passive bearing element is mounted.

Figure 8:
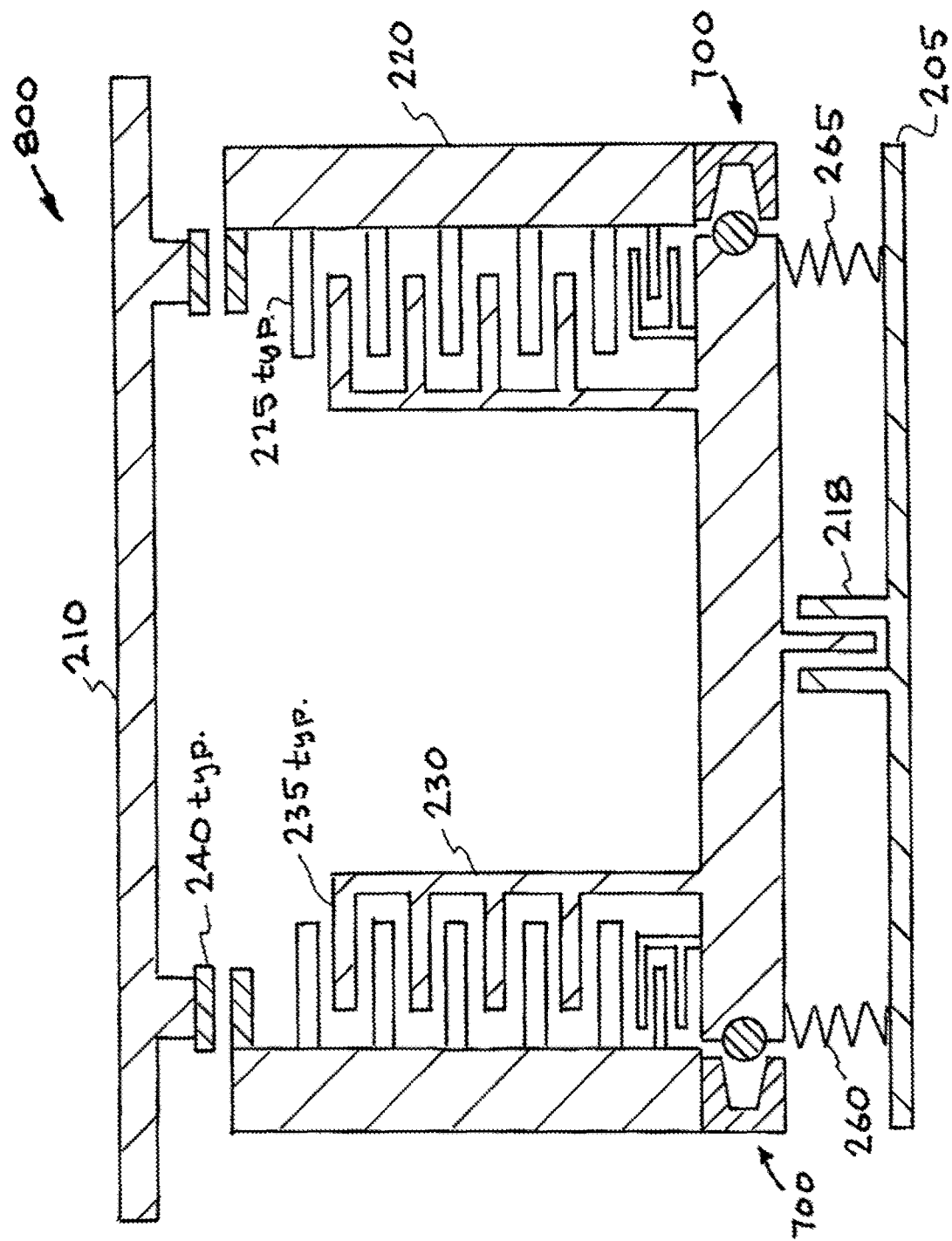
FIG. 8 depicts an embodiment of an ES device with an integrated touch-down bearing

FIG. 8 depicts an embodiment of an ES device, 800, to which is integrated the touch-down bearing, 700. The touch-down bearing would perform two functions, as follows; First, and for the embodiment that we are describing here, when the rotor is at rest, the fact that its levitating passive magnetic bearing arrays are unstable in the axial direction, means that the touchdown bearing would be engaged on either its upper or its lower conical surface. As the rotor is spun up from rest, the Halbach stabilizer subsystem would come into play and pull the rotor to its force-equilibrium axial position, coinciding with the null-flux position of the stabilizer. This action would thus automatically disengage the touch-down bearing, 700. Second, upon any radially directed acceleration from seismic activity, or any axially directed seismic activity, not adequately absorbed by the compression springs, 260 and 265, the touch-down bearing 700 would come into play and prevent the rotor from moving by an (axial) amount sufficient to cause the rotor electrodes, 225, and stator electrodes, 235, of the E-S generator to contact each other. FIG. 8 thus shows the two outer annular magnets of centering array 250 rigidly attached to the center element 730 of touch-down bearing 700. The center annular magnet of centering array 250 is attached to the inner face of rotor 220 and is positioned between the two outer annular magnets. Alternatively, the configuration of centering array 250 can be reversed such that the two outer annular magnets are attached to the inner face of rotor 220 and the center annular magnet of centering array 250 is positioned between the two outer annular magnets and is fixedly attached to the center element 730 of touch-down bearing 700.

In summary, the passive magnetic bearing and stabilization subsystems, in conjunction with the touch-down bearing subsystem, as discussed herein, collectively performs critical major functions as follows: (1) stably levitating a flywheel rotor upon the inner surface, of which is mounted the rotating electrodes of an electrostatic generator; (2) maintaining the centering of the rotor electrodes axially with respect to the stator electrodes; and, (3) helping to protect the rotor and E-S generator system from damage caused by seismic activity.

Figure 9:
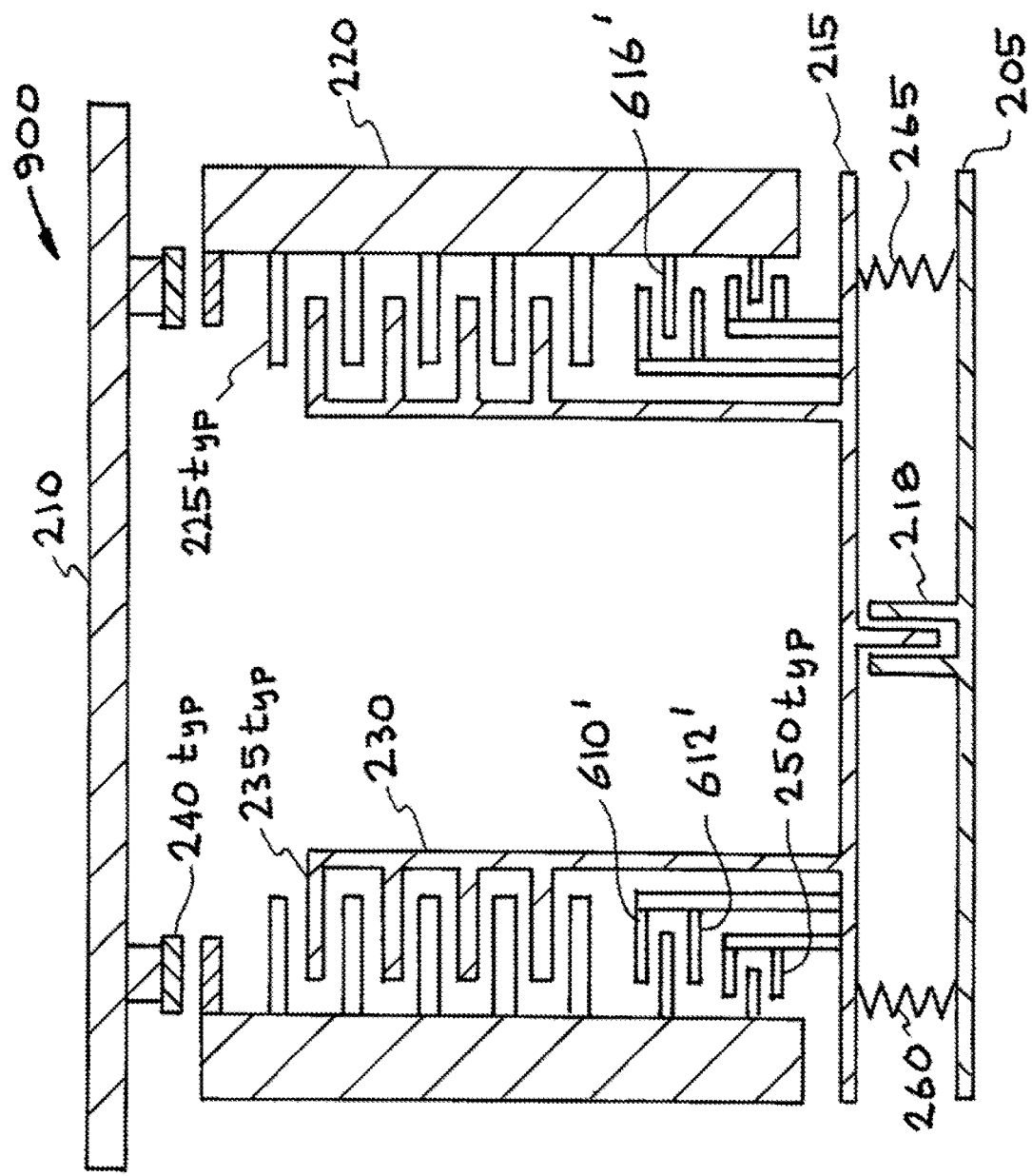
FIGS. 9-11 show embodiments, each with alternate triplet array and Halbach-based axial stabilizing array configurations and further including a guide pin, a guide sleeve and a compression-spring to ensure that the motion of the planar support platform is constrained to purely vertical motion.

In FIG. 9, Halbach arrays 610' and 612' are rigidly mounted to planar support platform 215. Inductive circuit element 616' is positioned between Halbach arrays 610' and 612' and is rigidly mounted to the inner face of rotor 220. The two outer annular magnets of centering array 250 are attached to planar support platform 215. The center annular magnet of centering array 250 is positioned between the two outer annular magnets and is attached to the inner face of rotor 220.

Figure 10:
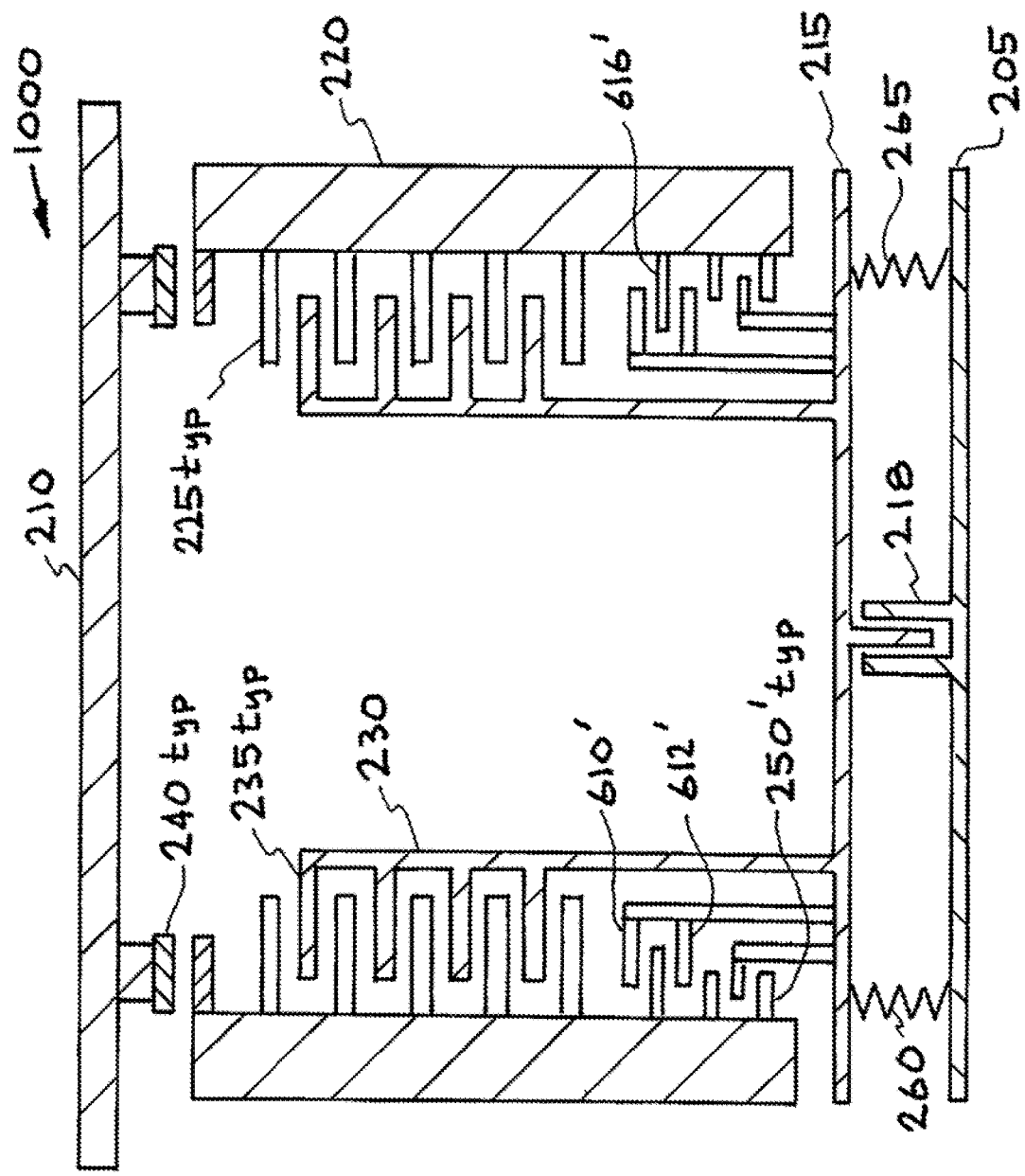

In FIG. 10, Halbach arrays 610' and 612' are rigidly mounted to planar support platform 215. Inductive circuit element 616' is positioned between Halbach arrays 610' and 612' and is rigidly mounted to the inner face of rotor 220. The two outer annular magnets of centering array 250 are attached to the inner face of rotor 220. The center annular magnet of centering array 250 is positioned between the two outer annular magnets and is attached to planar support platform 215.

Figure 11:
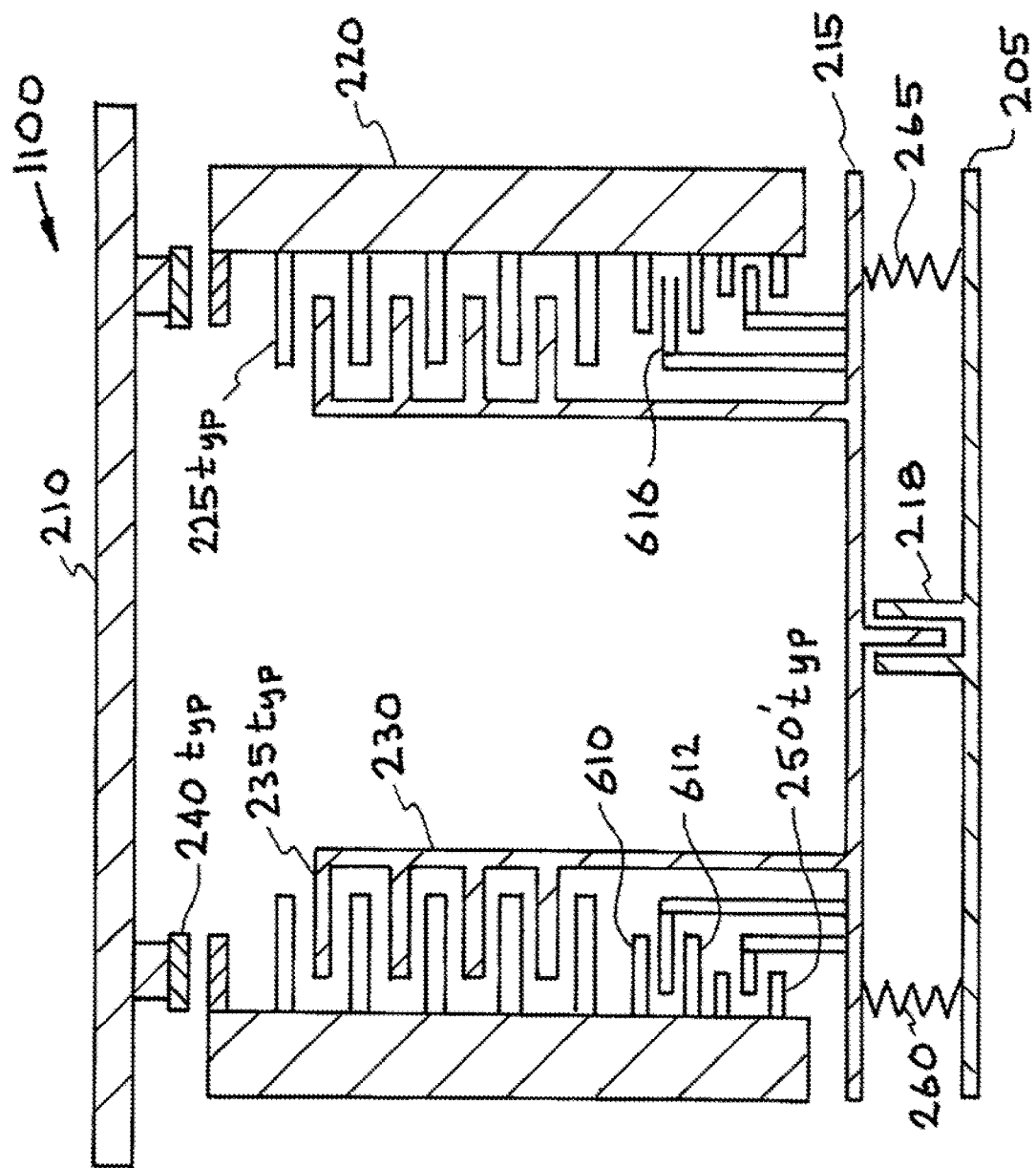

In FIG. 11, Halbach arrays 610 and 612 are rigidly mounted to the inner face of rotor 220. Inductive circuit element 616 is positioned between Halbach arrays 610 and 612 and is rigidly mounted to planar support platform 215. The two outer annular magnets of centering array 250 are attached to the inner face of rotor 220. The center annular magnet of centering array 250 is positioned between the two outer annular magnets and is attached to planar support platform 215.

Figure 12:
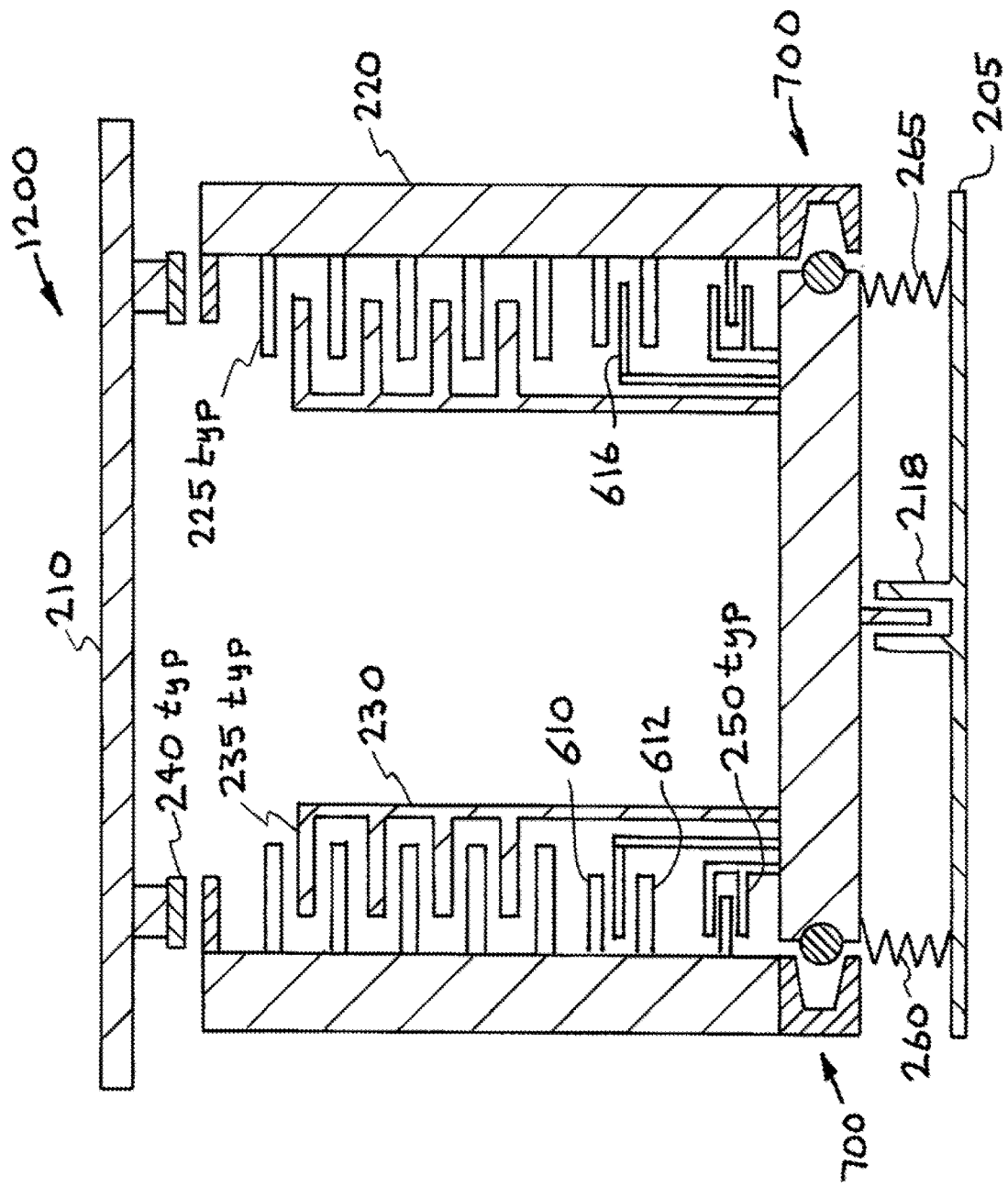
FIGS. 12-15 shows alternate embodiments of the electrode-centering and seismic-isolation system wherein each embodiment includes means for ensuring vertical motion of the support platform and further including a touch-down bearing.
Figure 13:
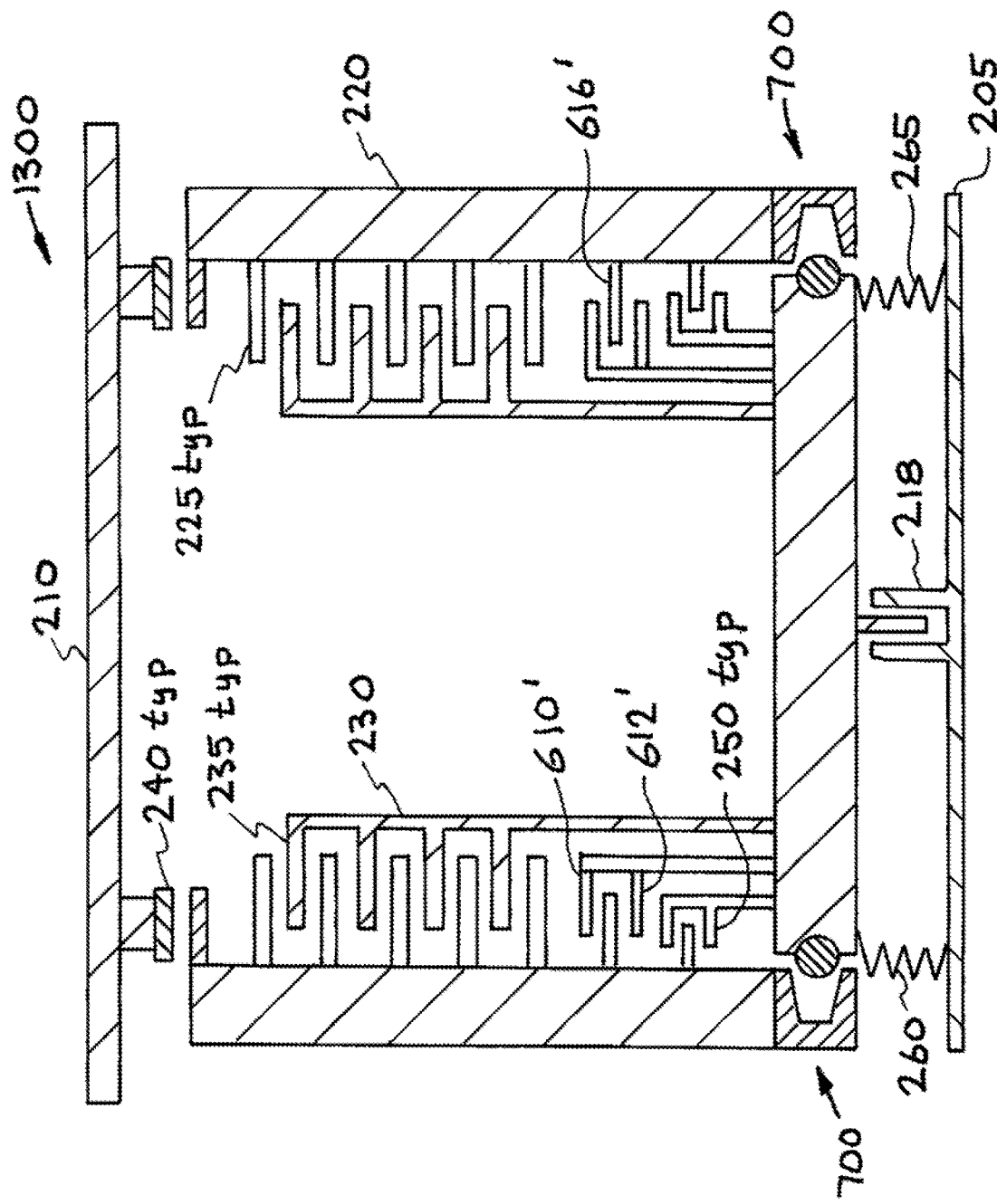
Figure 14:
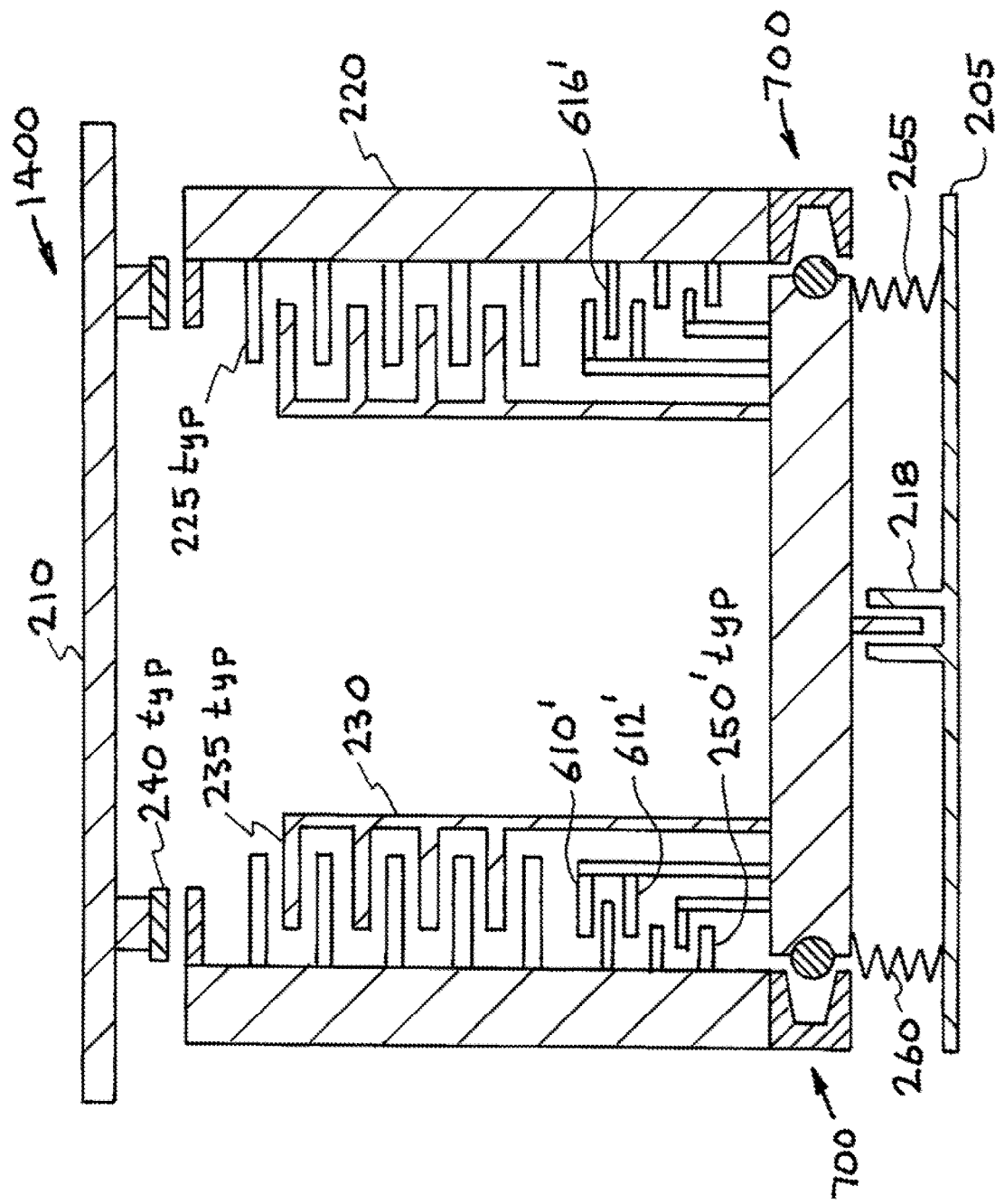
Figure 15:
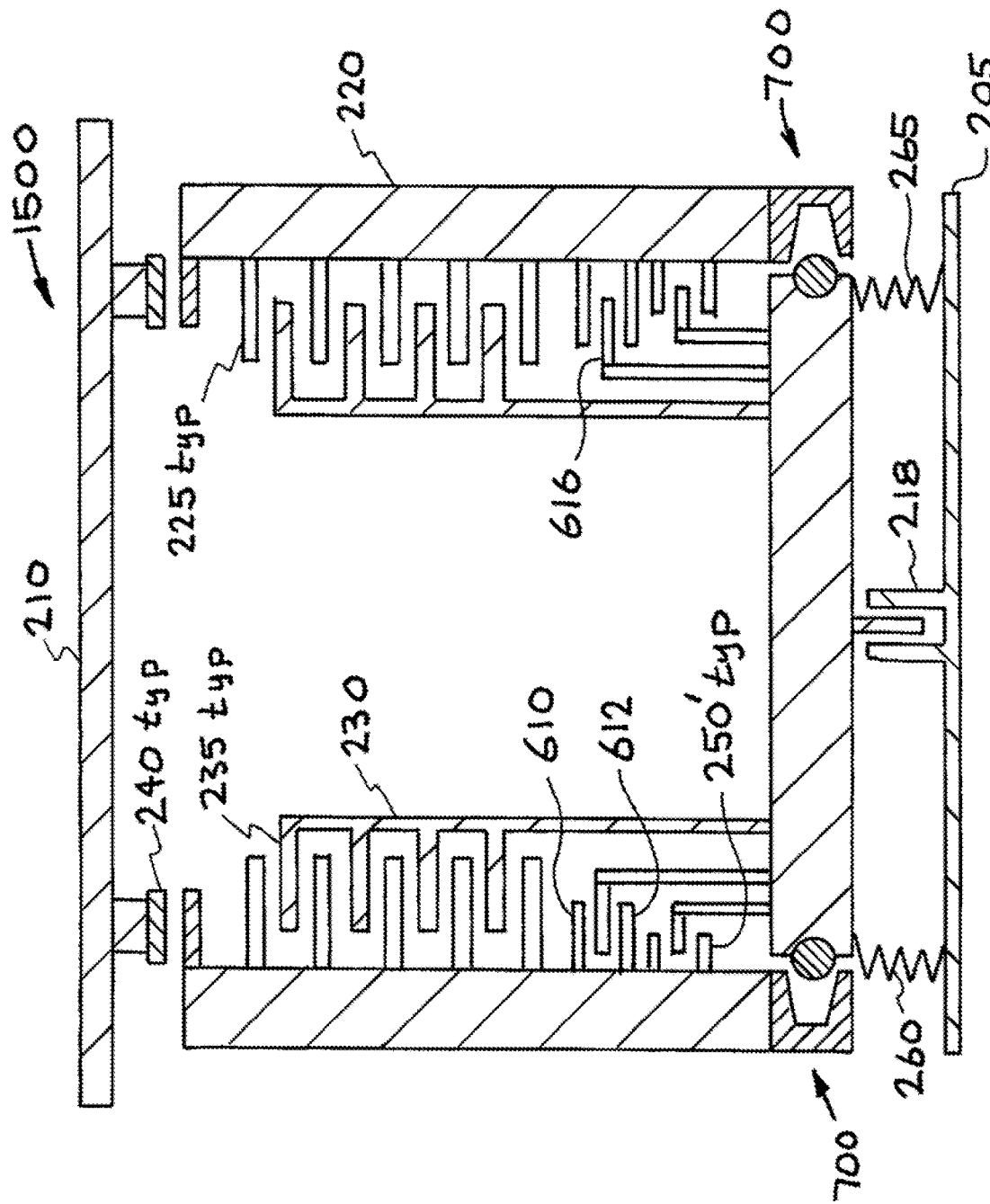

In FIG. 12, Halbach arrays 610 and 612 are rigidly mounted to the inner face of rotor 220. Inductive circuit element 616 is positioned between Halbach arrays 610 and 612 and is rigidly mounted to planar support platform 215. The two outer annular magnets of centering array 250 are attached to the inner face of rotor 220. The center annular magnet of centering array 250 is positioned between the two outer annular magnets and is attached to planar support platform FIG. 12 is identical to FIG. 6 except that support platform 215 has been replaced by touch-down bearing 700. FIG. 13 is identical to FIG. 9 except that support platform 215 has been replaced b touch-down bearing 700. FIG. 14 is identical to FIG. 10 except that support platform 215 has been replaced by touch-down bearing 700. FIG. 15 is identical to FIG. 11 except that support platform 215 has been replaced by touch-down bearing 700.

The foregoing description of the invention has been presented for purposes of illustration and description and is not intended to be exhaustive or to limit the invention to the precise form disclosed. Many modifications and variations are possible in light of the above teaching. The embodiments disclosed were meant o to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   an open cylindrical rotor having a central axis of rotation and an inner surface;
   a first support structure that is stationary relative to said rotor;
   a first annular element having its outermost edge attached to a first location of said inner surface of said rotor;
   a second annular element attached to said first support structure, wherein said second annular element is positioned in proximity to said first annular element, wherein at least one of said first annular element and said second annular demerit is configured to magnetically attract the other of said first annular element and said second annular element;
   a second support structure;
   an axial stabilizer selected from the group consisting of a first triplet array and a second triplet array, wherein said first triplet array comprises:
   a first magnetic annular element attached to a second location of said inner surface of said rotor;
   a second magnetic annular element attached to said second support structure; and
   a third magnetic annular element attached to said second support structure, wherein said second magnetic annular element and said third magnetic annular element are positioned on opposite sides, one to another, of said first magnetic annular element and both magnetically repel said first magnetic annular element, and wherein said second triplet array comprises:
   a first magnetic annular element attached to said second support structure;
   a second magnetic annular element attached to a third location of said inner surface of said rotor; and
   a third magnetic annular element attached to a fourth location of said inner surface of said rotor, wherein said second magnetic annular element and said third magnetic annular element are positioned on opposite sides of said first magnetic annular element and both magnetically repel said first magnetic annular element;
   a base and at least one compression spring attached to and located between said second support structure and said base;
   a guide tube fixedly attached to said base;
   a guide shaft fixedly attached to said second support structure, wherein said guide tube is configured to receive said guide shaft; and
   a passive stabilizer selected from the group consisting of a third triplet array and a fourth triplet array, wherein said third triplet array comprises:
   a first annular magnet element having edge fixedly attached to a fifth location of said inner surface of said rotor;
   a second annular magnet element having an edge fixedly attached to a sixth location of said inner surface of said rotor; and
   a first inductive element fixedly attached to said second support structure, wherein said first inductive element is located between said first annular magnet element and said second annular magnet element, and wherein said fourth triplet array comprises;
   a third annular magnet element having an edge fixedly attached to said second support structure;
   a fourth annular magnet element having an edge fixedly attached to said second support structure; and
   a second inductive element having an edge fixedly attached to a seventh location of said inner surface of said rotor, wherein said second inductive element is located between said third annular magnet element and said fourth annular magnet element.

2. The apparatus of claim 1, wherein said second support structure comprises a bearing support structure having at least one spherical element, said apparatus further comprising an annular bearing element fixedly attached to said rotor, wherein said annular bearing element comprises an annular conical slot facing said central axis of rotation, wherein a portion of said at least one spherical element is positioned within said slot.

3. The apparatus of claim 2, wherein when said rotor is at rest, said at least one spherical element will be in contact with said annular bearing element, wherein as said rotor is spun up from rest, said at least one spherical element will reach a speed wherein it will no longer make contact with said annular bearing element.

4. The apparatus of claim 1, further comprising a bearing support structure having at least one spherical element, wherein said bearing support structure is fixedly attached to said second support structure, said apparatus further comprising an annular bearing element fixedly attached to said rotor, wherein said annular bearing element comprises an annular conical slot facing said central axis of rotation, wherein a portion of said at least one spherical element is positioned within said slot.

5. The apparatus of claim 4, wherein when said rotor is at rest, said at least one spherical element will be in contact with said annular bearing element, wherein as said rotor is spun up from rest, said at least one spherical element will reach a speed wherein it will no longer make contact with said annular bearing element.

6. The apparatus of claim 1, wherein said first annular element together with said second annular element comprise a configuration selected from the group consisting of (i) wherein said first annular element is a ferromagnetic material and wherein said second annular element is a magnet (ii) wherein said first annular element is a magnet and wherein said second annular element is a ferromagnetic material, (iii) wherein said first annular element is a ferromagnetic material and wherein said second annular element is a Halbach array, (iv) wherein said first annular element is a Halbach array and wherein said second annular element is a ferromagnetic material and (v) wherein said first annular element is a Halbach array and wherein said second annular element is a Halbach array.

7. The apparatus of claim 1, wherein the net stiffness of each said at least one compression spring is smaller than the effective stiffness of said triplet array.

8. The apparatus of claim 1, wherein said apparatus is a flywheel based electrostatic (ES) motor/generator.

9. A method comprising:
providing the apparatus of claim 1; and
rotating said rotor.

\* \* \* \* \*